United States Patent
Lu

(10) Patent No.: US 6,230,030 B1
(45) Date of Patent: May 8, 2001

(54) HANDS-FREE SWITCHING DEVICE FOR USE WITH A MOBILE TELEPHONE IN A CAR

(75) Inventor: Ming-Huei Lu, Taipei Hsien (TW)

(73) Assignee: Halfa Enterprise Co., LTD, Taipei Hsien (TW)

( * ) Notice: Subject to any disclaimer, the term of this patent is extended or adjusted under 35 U.S.C. 154(b) by 0 days.

(21) Appl. No.: 09/289,981

(22) Filed: Apr. 13, 1999

(30) Foreign Application Priority Data

Sep. 25, 1998 (TW) .................................................. 87215989

(51) Int. Cl.⁷ ........................................................ H04Q 7/20
(52) U.S. Cl. ........................ 455/569; 455/153.1; 455/550
(58) Field of Search ............................ 455/88, 90, 153.1, 455/550, 556, 557, 568, 569, 575; 379/406, 420, 429, 432, 433, 434, 446, 447

(56) References Cited

U.S. PATENT DOCUMENTS

| | | | |
|---|---|---|---|
| 4,873,712 | * 10/1989 | Porco | 455/88 |
| 5,018,188 | * 5/1991 | Kowalski et al. | 455/569 |
| 5,590,414 | * 12/1996 | Marui et al. | 455/90 |
| 5,754,962 | * 5/1998 | Griffin | 455/569 |
| 5,771,464 | * 6/1998 | Umemoto et al. | 455/553 |
| 5,794,163 | * 8/1998 | Paterson et al. | 455/468 |
| 5,841,856 | * 11/1998 | Ide | 379/406 |
| 5,978,689 | * 11/1999 | Tuoriniemi et al. | 455/569 |
| 6,108,567 | * 8/2000 | Hosonuma | 455/569 |
| 6,138,040 | * 10/2000 | Nicholls et al. | 455/569 |

* cited by examiner

Primary Examiner—Nay Maung
(74) Attorney, Agent, or Firm—Foley & Lardner

(57) ABSTRACT

A hands-free switching device is adapted for use with a mobile telephone in a car having an audio output unit and a loudspeaker unit. The hands-free switching device includes a switch unit, a switch driver, and a driver control unit. The switch unit is capable of being switched to one of an activated position, where the switch unit electrically interconnects the mobile telephone and the loudspeaker unit to enable speech signals from the mobile telephone to be reproduced at the loudspeaker unit, and a deactivated position, where the switch unit electrically interconnects the audio output unit and the loudspeaker unit to enable audio signals from the audio output unit to be reproduced at the loudspeaker unit. The switch driver is associated operably with the switch unit and is capable of being enabled so as to control the switch unit to operate from the deactivated position to the activated position. The driver control unit is connected to the switch driver and is adapted to be connected to the mobile telephone so as to receive an output signal therefrom. The driver control unit enables the switch driver upon detection of the output signal from the mobile telephone.

6 Claims, 1 Drawing Sheet

HANDS-FREE SWITCHING DEVICE FOR USE WITH A MOBILE TELEPHONE IN A CAR

BACKGROUND OF THE INVENTION

1. Field of the Invention

The invention relates to a mobile telephone accessory, more particularly to a hands-free switching device for use with a mobile telephone in a car.

2. Description of the Related Art

Presently, portable communications devices, such as mobile telephones, are in widespread use. It is dangerous for one to use the mobile telephone while driving a car. Since only one hand of the user is available to control the car movement.

Hands-free devices are currently in use to overcome the aforesaid drawback. A conventional hands-free device includes a loudspeaker unit connected to a mobile telephone and disposed in a car. The conventional hands-free device will damage the interior of the car during installation. Furthermore it is not convenient for the user to turn off an audio output unit, such as a radio, in the car in the event of an incoming phone call.

Another conventional hands-free device includes an earphone that serves as a receiver for a mobile telephone. The earphone must be worn by the user to enable him/her to receive a phone call while driving a car. Use of the earphone while driving results in discomfort for the user.

SUMMARY OF THE INVENTION

Therefore, the object of the present invention is to provide a hands-free switching device for use with a mobile telephone that facilitates making or receiving a phone call while driving a car.

According to this invention, a hands-free switching device is adapted for use with a mobile telephone in a car having an audio output unit and a loudspeaker unit. The hands-free switching device includes a switch unit, a switch driver, and a driver control unit.

The switch unit has a set of first input switch contacts adapted to be connected to the mobile telephone, a set of second input switch contacts adapted to be connected to the audio output unit, a set of output switch contacts adapted to be connected to the loudspeaker unit, and a set of movable switch contacts connected electrically to the output switch contacts and movable between an activated position, where the movable switch contacts interconnect the first input switch contacts and the output switch contacts to enable speech signals from the mobile telephone to be reproduced at the loudspeaker unit, and a deactivated position, where the movable switch contacts interconnect the second input switch contacts and the output switch contacts to enable audio signals from the audio output unit to be reproduced at the loudspeaker unit.

The switch driver is associated operably with the movable switch contacts and is capable of being enabled so as to move the movable switch contacts from the deactivated position to the activated position.

The driver control unit is connected to the switch driver and is adapted to be connected to the mobile telephone so as to receive an output signal therefrom. The driver control unit enables the switch driver upon detection of the output signal from the mobile telephone.

BRIEF DESCRIPTION OF THE DRAWING

Other features and advantages of the present invention will become apparent in the following detailed description of the preferred embodiment with reference to the accompanying drawing, of which.

DETAILED DESCRIPTION OF THE PREFERRED EMBODIMENT

Figure 1:
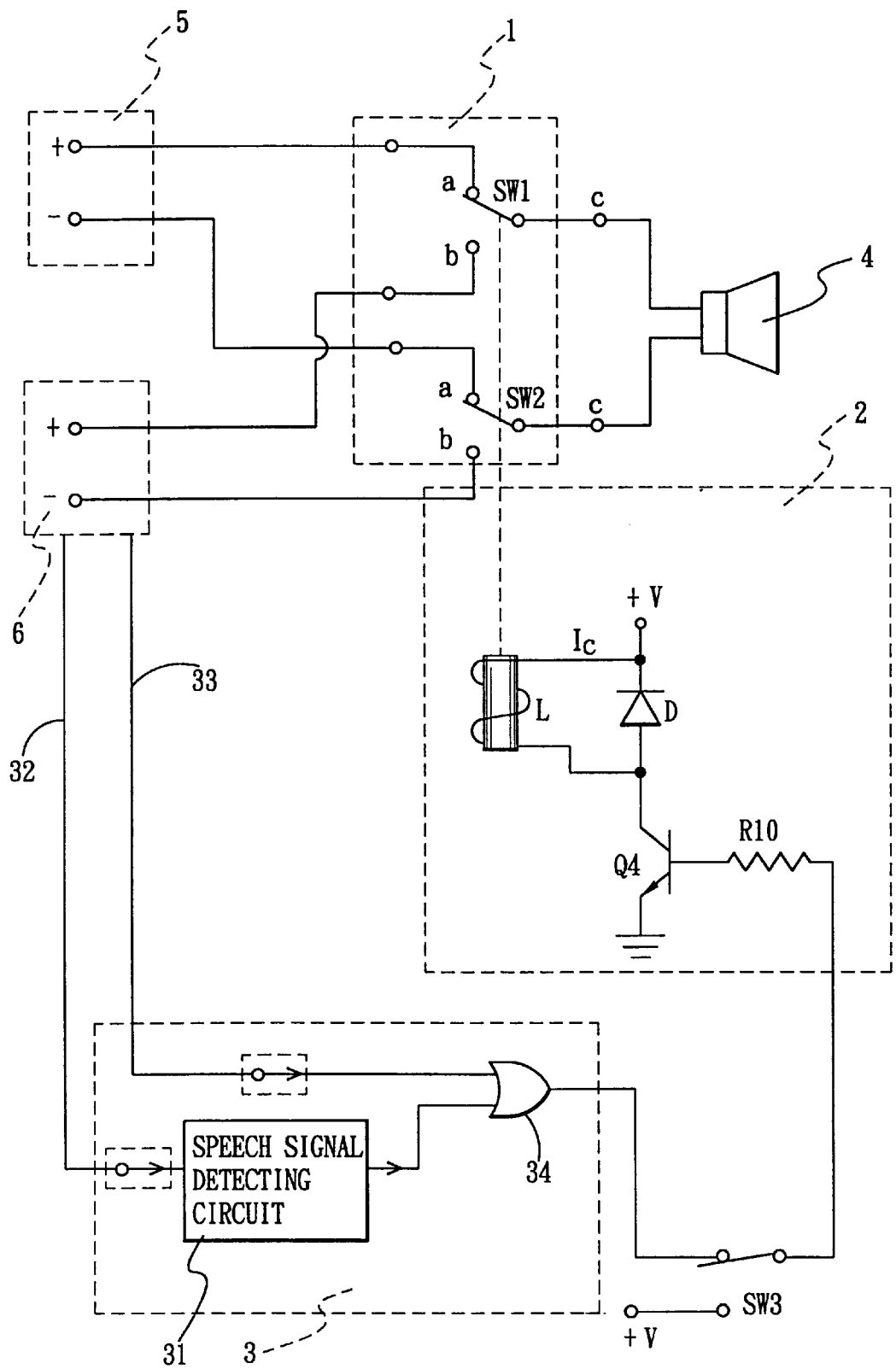
FIG. 1 is a schematic circuit diagram illustrating the preferred embodiment of a hands-free switching device for use with a mobile telephone in a car according to this invention.

Referring to FIG. 1, according to the preferred embodiment of this invention, a hands-free switching device is adapted for use with a mobile telephone 6 in a car having an audio output unit 5 and a loudspeaker unit 4, and includes a switch unit 1, a switch driver 2, and a driver control unit 3.

The switch unit 1 has a set of first input switch contacts (b) adapted to be connected to the mobile telephone 6, a set of second input switch contacts (a) adapted to be connected to the audio output unit 5, a set of output switch contacts (c) adapted to be connected to the loudspeaker unit 4, and a set of movable switch contacts (SW1, SW2) connected electrically to the output switch contacts (c) and movable between an activated position, where the movable switch contacts (SW1, SW2) interconnect the first input switch contacts (b) and the output switch contacts (c) to enable speech signals from the mobile telephone 6 to be reproduced at the loudspeaker unit 4, and a deactivated position, where the movable switch contacts (SW1, SW2) interconnect the second input switch contacts (a) and the output switch contacts (c) to enable audio signals from the audio output unit 5 to be reproduced at the loudspeaker unit 4.

The switch driver 2 is associated operably with the movable switch contacts (SW1, SW2) and is capable of being enabled so as to move the movable switch contacts (SW1, SW2) from the deactivated position to the activated position. The switch driver 2 includes a coil (L), a diode (D), a transistor (Q4), and a resistor (R10) The coil (L) is coupled electromagnetically to the movable switch contacts (SW1, SW2).

The driver control unit 3 is connected to the switch driver 2 and is adapted to be connected to the mobile telephone 6 so as to receive an output signal therefrom. The driver control unit 3 enables the switch driver 2 upon detection of the output signal from the mobile telephone 6. The output signal from the mobile telephone 6 can be a muting signal or a speech signal depending on different specifications of mobile telephones. The driver control unit 3 includes an OR gate 34 and a speech signal detecting circuit 31 that enables the switch driver 2 upon detection of the speech signal for a preset time period. The OR gate 34 has two input ends and an output end connected to the resistor R10. One of the input ends is connected to a muting signal line 33 for receiving the muting signal from the mobile telephone 6, and the other one of the input ends is connected to the speech signal detecting circuit 31, which is connected to a speech signal line 32 for receiving the speech signal from the mobile telephone 6.

Therefore, in the event of an incoming phone call, the driver control unit 3 receives the output signal from the mobile telephone 6 and provides a logical output voltage that enables the transistor (Q4), thereby resulting in current flow ($I_c$) to the coil (L) to move the movable switch contacts (SW1, SW2) from the deactivated position to the activated position.

The hands-free switching device further includes a manual switch (SW3) connected to the switch driver 2 and operable so as to enable the switch driver 2 regardless of whether the output signal from the mobile telephone 6 is detected by the driver control unit 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A hands-free switching device for use with a mobile telephone in a car having an audio output unit and a loudspeaker unit, said hands-free switching device comprising:

a switch unit including
      a set of first input switch contacts adapted to be connected to the mobile telephone,
      a set of second input switch contacts adapted to be connected to the audio output unit,
      a set of output switch contacts adapted to be connected to the loudspeaker unit, and
      a set of movable switch contacts connected electrically to said output switch contacts and movable between an activated position, where said movable switch contacts interconnect said first input switch contacts and said output switch contacts to enable speech signals from the mobile telephone to be reproduced at the loudspeaker unit, and a deactivated position, where said movable switch contacts interconnect said second input switch contacts and said output switch contacts to enable audio signals from the audio output unit to be reproduced at the loudspeaker unit;

a switch driver associated operably with said movable switch contacts and capable of being enabled so as to move said movable switch contacts from the deactivated position to the activated position; and a driver control unit connected to said switch driver and adapted to be connected to the mobile telephone so as to receive an output signal therefrom, said driver control unit enabling said switch driver upon detection of the output signal from the mobile telephone.

2. The hands-free switching device as claimed in claim 1, wherein said switch driver includes a coil that is coupled electromagnetically to said movable switch contacts.

3. The hands-free switching device as claimed in claim 1, wherein the output signal from the mobile telephone is a muting signal.

4. The hands-free switching device as claimed in claim 1, wherein the output signal from the mobile telephone is a speech signal.

5. The hands-free switching device as claimed in claim 4, wherein said driver control unit includes a speech signal detecting circuit that enables said switch driver upon detection of the speech signal for a preset time period.

6. The hands-free switch device as claimed in claim 1, further comprising a manual switch connected to said switch driver and operable so as to enable said switch driver regardless of whether the output signal from the mobile telephone is detected by said driver control unit.

* * * * *